US 7,356,035 B1

(12) United States Patent
Jayakumar et al.

(10) Patent No.: US 7,356,035 B1
(45) Date of Patent: Apr. 8, 2008

(54) SYSTEM AND METHOD FOR AAL5 ENHANCED ENCAPSULATION

(75) Inventors: Jayakumar Jayakumar, San Jose, CA (US); Hariprasad Ginjpalli, Cupertino, CA (US); Durai Chinnaiah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 910 days.

(21) Appl. No.: 09/992,266

(22) Filed: Nov. 5, 2001

(51) Int. Cl.
*H04L 12/28* (2006.01)
*H04L 12/56* (2006.01)
*H04J 3/16* (2006.01)
*H04J 3/22* (2006.01)

(52) U.S. Cl. ............... 370/395.1; 370/466; 370/395.6; 370/395.5

(58) Field of Classification Search .............. None
See application file for complete search history.

(56) References Cited

U.S. PATENT DOCUMENTS

| | | | |
|---|---|---|---|
| 6,339,595 B1* | 1/2002 | Rekhter et al. ............ | 370/392 |
| 6,477,166 B1* | 11/2002 | Sanzi et al. ............... | 370/395.1 |
| 6,512,768 B1* | 1/2003 | Thomas ..................... | 370/389 |
| 6,603,756 B1* | 8/2003 | Tappan ...................... | 370/351 |
| 6,707,819 B1* | 3/2004 | Fraser et al. .............. | 370/395.1 |
| 6,731,639 B1* | 5/2004 | Ors et al. .................. | 370/395.51 |
| 6,771,663 B1* | 8/2004 | Jha ............................ | 370/473 |
| 6,791,985 B1* | 9/2004 | Ashwood-Smith et al. ..................... | 370/395.5 |
| 6,882,643 B1* | 4/2005 | Mauger et al. ............ | 370/389 |
| 6,912,590 B1* | 6/2005 | Lundback et al. ......... | 709/238 |
| 7,260,083 B2* | 8/2007 | Reeves et al. ............ | 370/351 |
| 2002/0053071 A1* | 5/2002 | Yoon et al. ................ | 717/136 |
| 2002/0071439 A1* | 6/2002 | Reeves et al. ............ | 370/400 |
| 2002/0136223 A1* | 9/2002 | Ho ............................ | 370/395.51 |
| 2005/0008020 A1* | 1/2005 | Ashwood-Smith et al. ..................... | 370/395.1 |

OTHER PUBLICATIONS

Data & Computer Communications, Sixth Edition, William Stallings, © 1999, p. 375.*
Luca Martini, et al., "Encapsulation Methods for Transport of Layer 2 Frames Over MPLS," Internet Draft, draft-martini-12 circuit-encap-mpls-02.txt, 15 pages (May 2001).

* cited by examiner

*Primary Examiner*—Kwang Bin Yao
*Assistant Examiner*—Warner Wong
(74) *Attorney, Agent, or Firm*—Blakely, Sokoloff, Taylor & Zafman LLP

(57) ABSTRACT

A system and method for AAL5 enhanced encapsulation is disclosed. The method, comprises receiving an AAL5 CPCS-SDU at a router; encapsulating the AAL5 CPCS-SDU into an AAL5 enhanced packet at the router; generating an MPLS packet from the AAL5 enhanced packet, wherein the AAL5 enhanced packet comprises an ATM header; and routing the MPLS packet over an MPLS network.

40 Claims, 5 Drawing Sheets

SYSTEM AND METHOD FOR AAL5 ENHANCED ENCAPSULATION

BACKGROUND OF THE INVENTION

1. Field of the Invention

This invention relates generally to the field of data management through a digital network. More particularly, the invention relates to system and method for AAL5 enhanced encapsulation.

2. Description of the Related Art

With the boom of the Internet and digital communication networking, many advances have been made in router technology. Layer 2 protocols such as Frame Relay, ATM Adaptation Layer, Synchronous Optical Network (SONET), or Ethernet transport their associated Protocol Data Units ("PDUs") across a MultiProtocol Label Switching ("MPLS") network using several methods of encapsulation. MPLS uses labels, or tags, that contain forwarding information, which are attached to IP packets by a router that sits at the edge of the network known as a label edge router (LER). The routers in the core of the network, known as label switch routers (LSRs), examine the label more quickly than if they had to look up destination addresses in a routing table.

The Pseudo Wire Edge to Edge Emulation (PWE3) WorkingGroup of the Internet Engineering Task Force (IETF) has developed a mechanism for transporting the various layer 2 protocols described above over MPLS. One prior art mechanism is described in "Encapsulation Methods for Transport of Layer 2 Frames Over MPLS," by Luca Martini et. Al. (May, 2001) Prior art mechanisms for sending AAL5 traffic over MPLS pose scalability challenges for large numbers of ATM-AAL5 connections in terms of provisioning.

SUMMARY OF THE INVENTION

A system and method for AAL5 enhanced encapsulation is disclosed. The method comprises receiving an AAL5 CPCS-SDU at a router; encapsulating the AAL5 CPCS-SDU into an AAL5 enhanced packet at the router; generating an MPLS packet from the AAL5 enhanced packet, wherein the AAL5 enhanced packet comprises an ATM header; and routing the MPLS packet over an MPLS network.

Other features and advantages of the present invention will be apparent from the accompanying drawings and from the detailed description that follows below.

BRIEF DESCRIPTION OF THE DRAWINGS

A better understanding of the present invention can be obtained from the following detailed description in conjunction with the following drawings, in which.

DETAILED DESCRIPTION

A system and method for AAL5 enhanced encapsulation is disclosed. The method comprises receiving an AAL5 CPCS-SDU at a router; encapsulating the AAL5 CPCS-SDU into an AAL5 enhanced packet at the router; generating an MPLS packet from the AAL5 enhanced packet, wherein the AAL5 enhanced packet comprises an ATM header; and routing the MPLS packet over an MPLS network.

Embodiments of the present invention include various steps, which will be described below. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

An Exemplary Network Architecture

Figure 1:
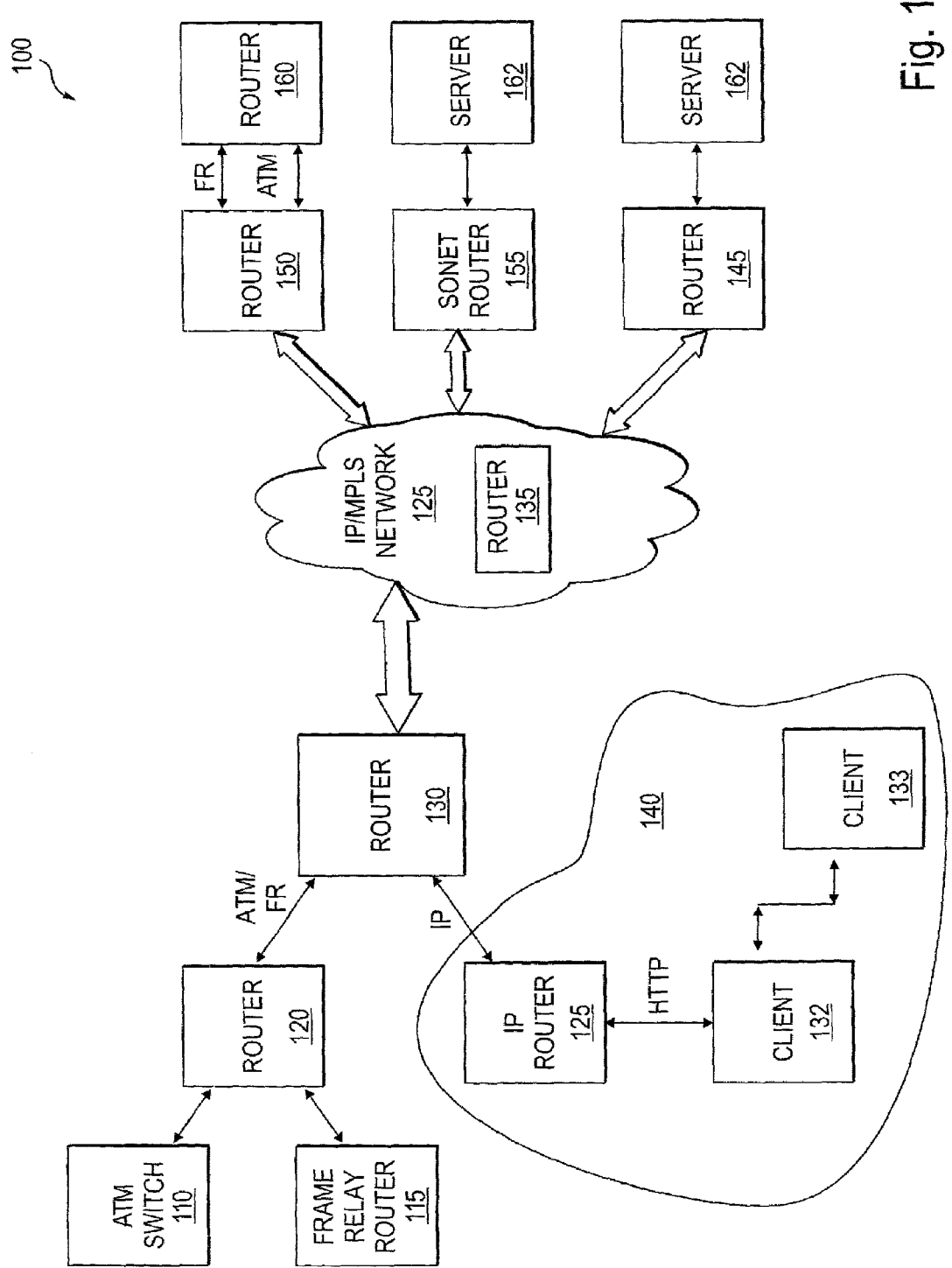
FIG. 1 illustrates a block diagram of an exemplary network architecture used to implement elements of the invention.

Elements of the present invention may be included within an Internet Protocol ("IP") based network 100 such as that illustrated in FIG. 1. According to the embodiment depicted in FIG. 1, one or more servers 162 communicate to a plurality of clients 132-133. The clients 132-133 may transmit and receive data from ATM switches 110 over a variety of communication media including (but not limited to) a local area network 140 and/or a larger network 125 (e.g., the Internet). In one embodiment, network 125 is an IP MPLS Network that carries data of various transport protocols through it. For example, ATM Switch 110 may transmit ATM Cells to IP MPLS Network 125 via Routers 120 and 130. As also shown in FIG. 1, Frame Relay router 115 may transmit Frame Relay frames to Network 125, via Routers 120 and 130. Similarly optical data may be transmitted through SONET Router 155 or generic IP data via IP router 125 and router 130. Routers 130, 145, 150, and 155 are Label Edge Routers; and router 135 within network 125 is a Label Switch Router. System 100 may transmit enhanced AAL5 encapsulated packets according to the present method described herein. The present method may be integrated within both label edge routers and label switch routers to transport ATM AAL5 traffic over network 125 using an enhanced encapsulation method described herein.

An Exemplary Router System

Figure 2:
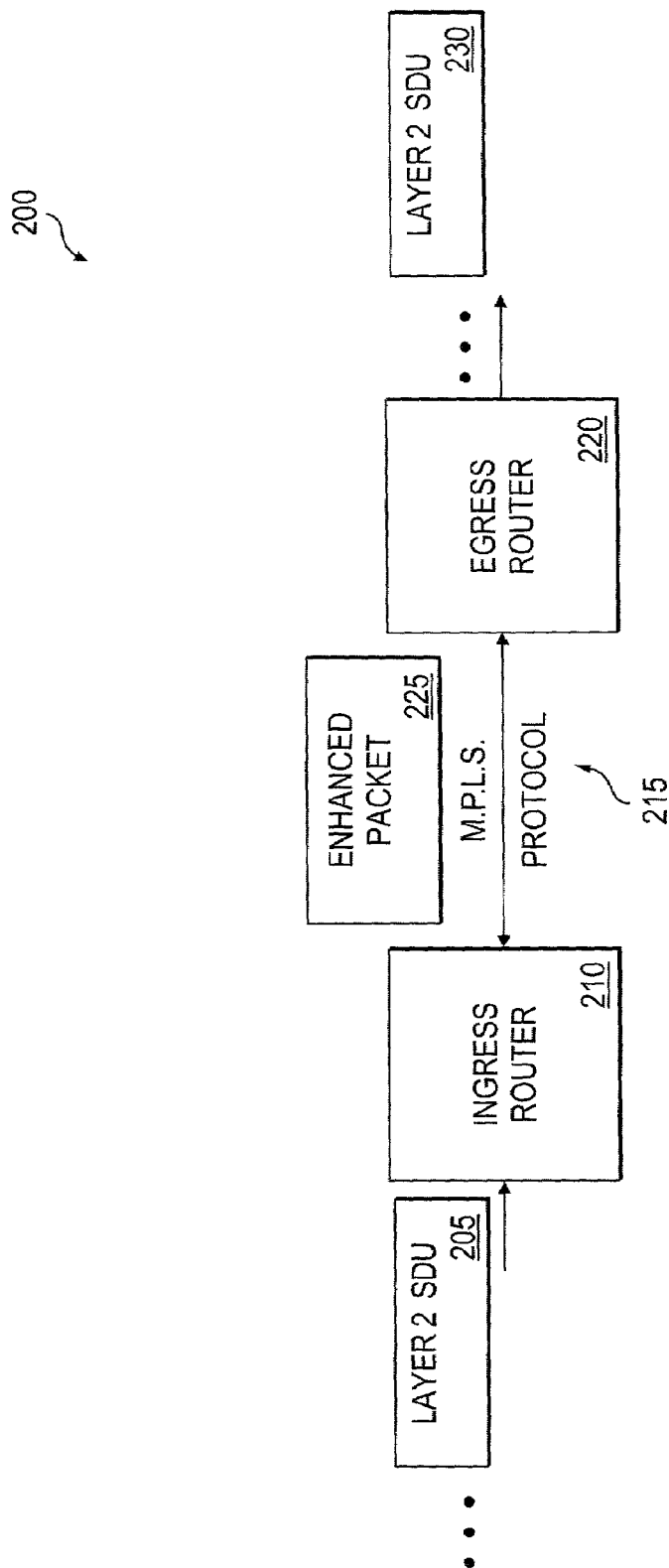
FIG. 2 illustrates a block diagram of an exemplary router network used to implement elements of the invention.

FIG. 2 illustrates a block diagram of a router system 200 for transporting enhanced AAL5 traffic. Ingress router 210 and egress router 220 may be either a label edge router (such as those shown in FIG. 1) or a label switch router (also shown in FIG. 1).

MPLS network 215 inter-connects ingress router 210 and egress router 220. Network 215 could be an IP/MPLS network, such as network 125, shown in FIG. 1. In MPLS network 215, it is possible to carry the Service Data Units ("SDUs") 205 of layer 2 protocols by prepending an MPLS label stack to SDU 205. The present enhanced AAL5 encapsulation method is performed within system 200. The SDU 205 is received at ingress router 210, encapsulated at ingress router 210, transported over MPLS network 215, decapsulated at egress router 220, and transmitted out of egress router 220 as SDU 230. When transporting layer 2 protocols over MPLS it is, in most cases, not necessary to transport the layer 2 encapsulation across the MPLS network 215. In most cases the layer 2 header can be stripped at ingress router 210, and reproduced at egress router 220. The structure of routers 210 and 220 will be discussed below in relation to FIG. 3. The structure of the enhanced packet 225 will be discussed below in relation to FIG. 4.

Alternative communication channels such as wireless communication via satellite broadcast (not shown) are also contemplated within the scope of the present invention. Routers of FIG. 1 may be high-speed routers such as those manufactured by Cisco Systems of San Jose, Calif.

Servers 162 may include a database for storing various types of data. This may include, for example, specific client data (e.g., client account information and client preferences) and/or more general data. The database on Servers 162 in one embodiment runs an instance of a Relational Database Management System (RDBMS), such as Microsoft™ SQL-Server, Oracle™ or the like.

A user/client may interact with and receive feedback from servers 162 using various different communication devices and/or protocols. According to one embodiment, a user connects to servers 162 via client software. The client software may include a browser application such as Netscape Navigator™ or Microsoft Internet Explorer™ on the user's personal computer which communicates to electronic commerce servers 162 via the Hypertext Transfer Protocol (hereinafter "HTTP").

An Exemplary Router Architecture

Figure 3:
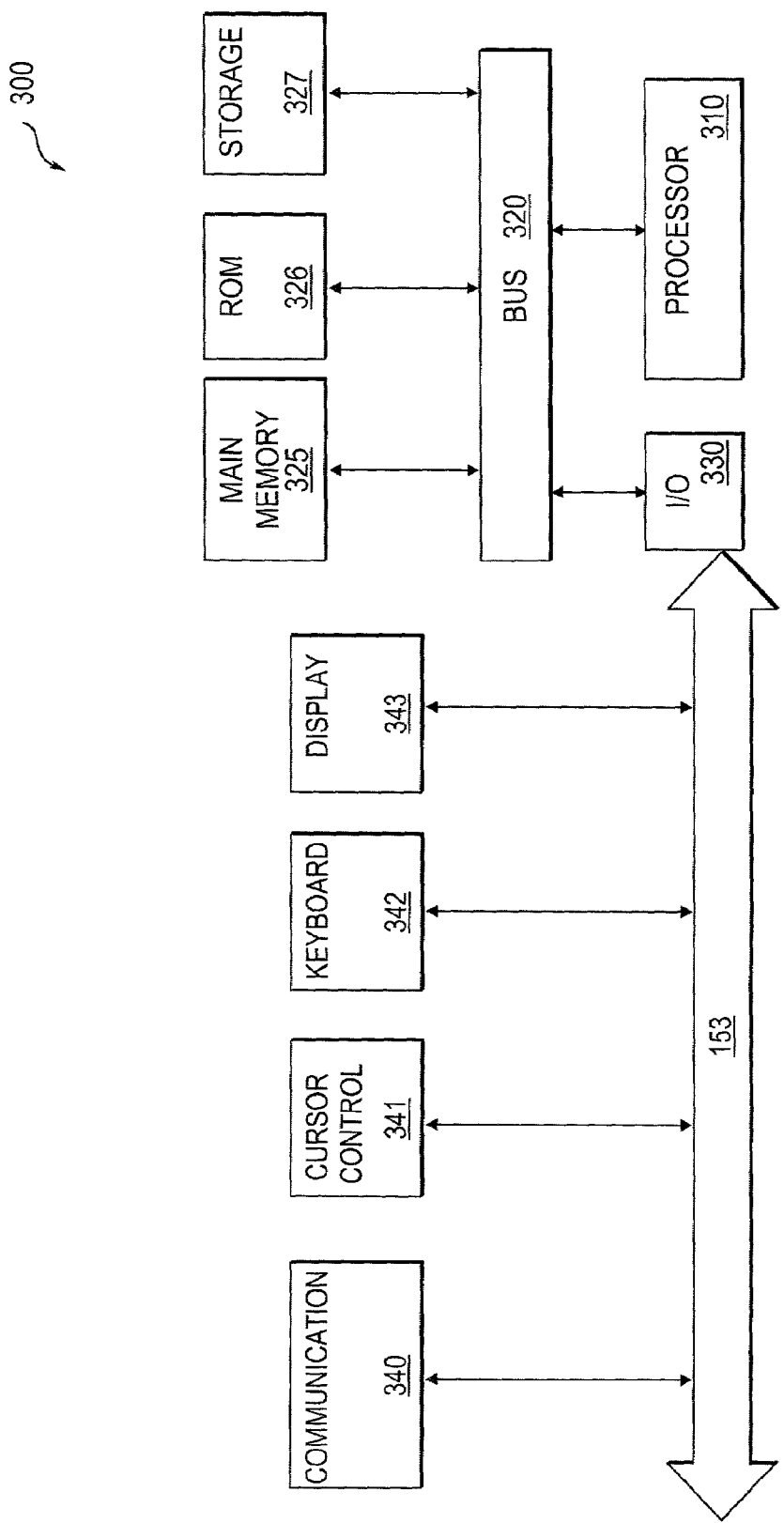
FIG. 3 illustrates an exemplary router architecture used to implement elements of the invention.

Having briefly described an exemplary network architecture which employs various elements of the present invention, a router system 300 representing exemplary routers 210, 220, in which elements of the present invention may be implemented will now be described with reference to FIG. 3.

One embodiment of router system 300 comprises a system bus 320 for communicating information, and a processor 310 coupled to bus 320 for processing information. Router system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Router system 300 also may include a read only memory (ROM) and/or other static storage device 326 coupled to bus 320 for storing static information and instructions used by processor 310.

A data storage device 327 such as a magnetic disk or optical disc and its corresponding drive may also be coupled to router system 300 for storing information and instructions. Router system 300 can also be coupled to a second I/O bus 350 via an I/O interface 330. A plurality of I/O devices may be coupled to I/O bus 350, including a display device 343, an input device (e.g., an alphanumeric input device 342 and/or a cursor control device 341)

The communication device 340 is for accessing other computers (servers, routers or clients) via a network 125, 140. The communication device 340 may comprise a modem, a network interface card, or other well-known interface device, such as those used for coupling to Ethernet, token ring, or other types of networks.

An Exemplary Enhanced AAL5 Packet

Figure 4:
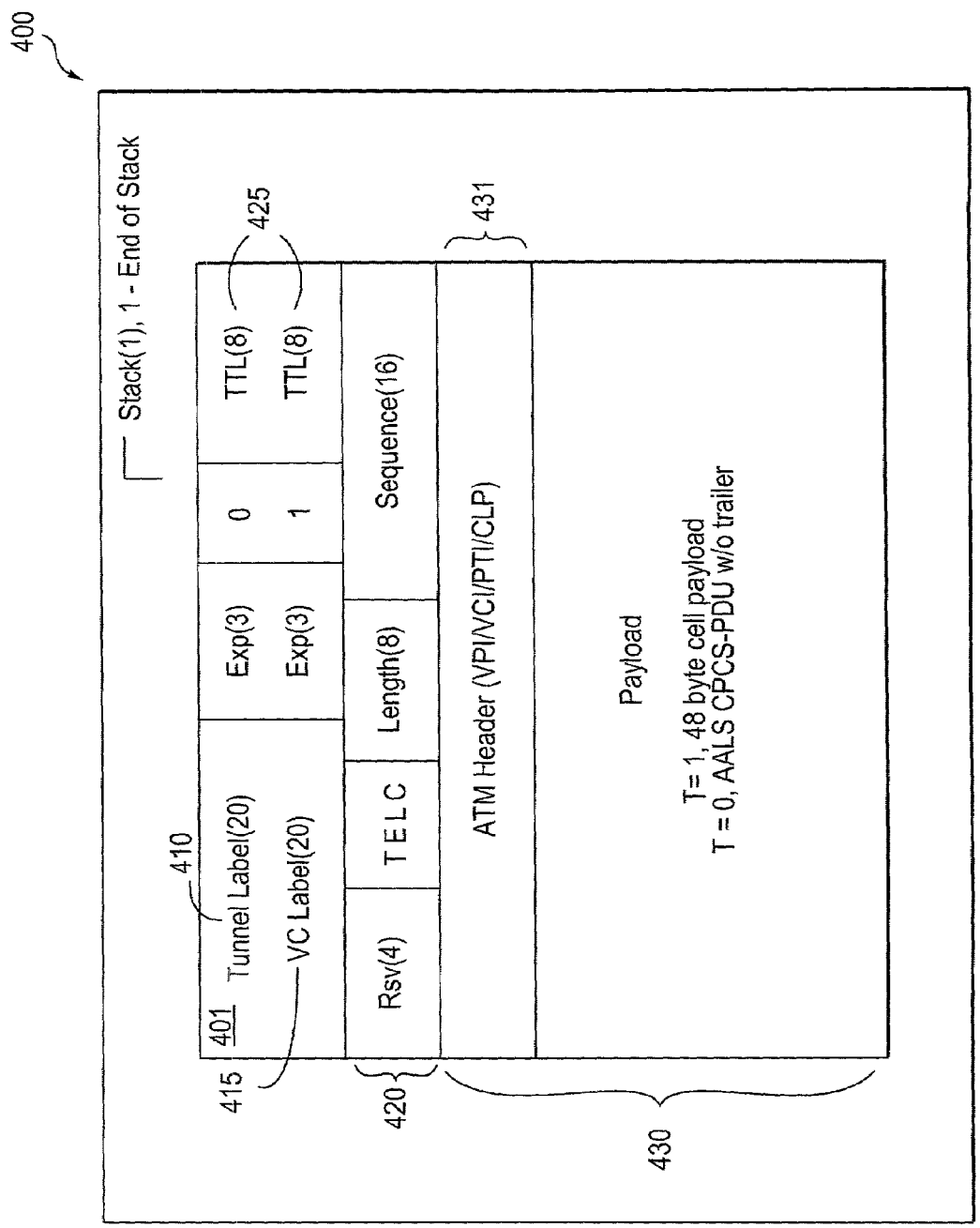
FIG. 4 illustrates an exemplary enhanced AAL5 packet format 400.

FIG. 4 illustrates an exemplary enhanced AAL5 packet format 400. The present enhanced AAL5 encapsulation method supports either ATM single cell payload or AAL5 Common Part Convergence Sublayer-Service Data Unit (CPCS-SDU) payload. The AAL5 CPCS-SDU enhanced encapsulation consists of the MPLS label stack 401, control word 420, a 4 byte ATM header 431, and the AAL5 CPCS-PDU payload 430. The MPLS label stack's format is known to one of ordinary skill in the art. However, some description of the format is provided. The tunnel label 410 of stack 401, is negotiated between ingress router 210 and the egress router 220. The VC label 415 of stack 401 is negotiated between Label Edge Routers and identifies a virtual circuit between the endpoints. The VC label 415 identifies the flow to be of AAL5 enhanced to egress router 220. The payload type is indicated by a T bit defined in a 32 bit control word 420. If T=1, then the payload 430 is a 48 byte ATM cell payload. If T=O, then the payload 430 is an AAL5 CPCS-SDU.

There are 3 conditions that may need to be satisfied when transporting layer 2 protocols over MPLS networks:
   i. sequentiallity may need to be preserved;
   ii. small packets may need to be padded in order to be transmitted on a medium where the minimum transport unit is larger than the actual packet size; and
   iii control bits carried in the header of the layer 2 frame may need to be transported.

The control word 420 addresses these three conditions. In all cases the egress router 220 is aware if the ingress router 210 sends a control word over a specific virtual circuit (VC). The first 4 bits of control word 420 are reserved for future use and set to zero when transmitting and are ignored upon receipt at egress router 220. The next 4 bits provide space for carrying protocol specific flags.

The T bit, as described above, is the transport type bit. Bit T of the control word indicates whether the MPLS packet contains an ATM cell or an AAL CPCS-SDU.

The E (EFCI) bit is set to 1 by the ingress router 210 when the final cell of those that transported the AAL CPCS-SDU is set to 1, or if the EFCI bit of the single ATM cell to be transported in the MPLS packet is set to 1. Otherwise the E bit is set to zero. The egress router 220, sets the E bit of all cells that transport the AAL5 CPCS-SDU to the value contained in this field.

The L (CLP) bit is set to 1 by the ingress router 210 when the CLP bit of any of the ATM cells that transported the AAL5 CPCS-SDU is set to one. Otherwise the L bit is set to zero. The egress router 220, sets the CLP bit of all cells that transport the AAL5 CPCS-SDU to the value contained in this field.

The C (Command/Response Field) Bit is set by the ingress router 210. When Frame Relay traffic is being transported, the least significant Bit of the CPCS-SDU may contain the Frame Relay Command/Response bit. The C bit is set to the Frame Relay Command/Response bit. The egress router 220 copies the C bit to the CPCS-UU least significant Bit of the AAL5 CPCS-SDU.

The next 8 bits of the control word 420 provide a length field, which is used as follows: If the packet's length (defined as the length of the layer 2 payload plus the length of the control word) is less than 64 bytes, the length field is set to the packet's length field is set to the packet's length. Otherwise the length field is set to zero. The value of the length field, if non-zero, is used to remove any padding. When the packet reaches egress router 220, the padding may be removed.

The next 16 bits of control word 420 contain a sequence number that may be used to guarantee ordered packet delivery. The sequence number value zero is used to indicate an unsequenced packet.

ATM header 431 is used as the ATM header for the cells after segmentation. Although ATM headers are generally 5 bytes in length, only 4 bytes are of interest in the present method and system for enhanced AAL5 encapsulation since the fifth byte is used for header corruption detection and correction. The fifth byte does not necessarily need to be used if other mechanisms for header corruption detection and correction exist. The 4 byte ATM header 431 identifies the ATM connection. Since each packet contains a 4 byte header, multiple AAL5 connections may be multiplexed over a single VC label 415. The ATM header 431 of the cells are extracted and modified so that the PTI/CLP fields reflect the E bit and L bit values of control word 420 described above.

The 12 bit Virtual Path Identifier ("VPI") value is obtained from ATM Header 431 in the incoming SDU 205 by the ingress router 210. The egress router 220 may generate a new VPI based on the value of the VC label 415 and ignore the VPI contained in ATM header 431.

The 1 bit Virtual Connection Identifier ("VCI") value may be obtained from the ATM Header 431 from the incoming SDU 205 by the ingress router 210. The egress router 220 may generate a new VCI based on the value of the VC label 415.

The 3 bit PTI and 1 bit CLP fields of ATM Header 431 are the PTI and CLP fields of the incoming SDU 205.

An Exemplary Method for Enhanced AAL5 Encapsulation

Figure 5:
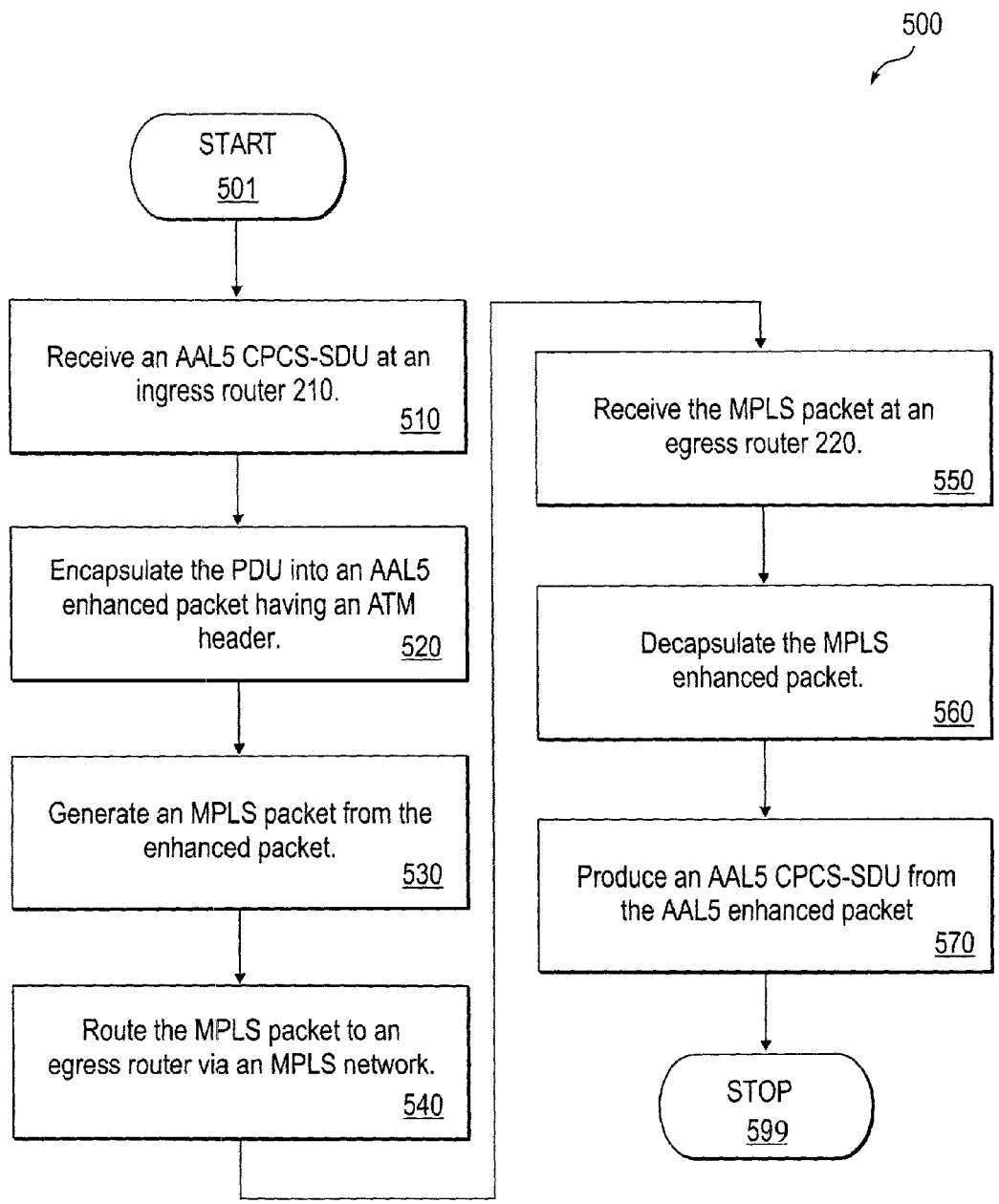
FIG. 5 illustrates an exemplary diagram of a method for enhanced AAL5 encapsulation.

FIG. 5 illustrates an exemplary diagram of a method for enhanced AAL5 encapsulation. The method begins at start block 501. Flow continues to processing block 510 where ingress router 210 receives an AAL5 CPCS-SDU. At processing block; 520, router 210 encapsulates the AAL5 CPCS-SDU into an AAL5 enhanced packet. The AAL5 enhanced packet comprises an ATM header, MPLS label stack, control word and the AAL5 CFCS-PDU. Ingress router 210 generates an MPLS packet from the AAL5 enhanced packet at processing block 530. Flow continues to processing block 540 where ingress router 210 routes the MPLS packet over an MPLS network 215.

Flow continues to processing block 550, where egress router 220 receives an MPLS packet. The egress router decapsulates the MPLS packet when the MPLS packet is an AAL5 enhanced packet at processing block 560. Flow continues to processing block 570, where egress router 220 produces an AAL5 CPCS-SDU from the AAL5 enhanced packet. The AAL5 enhanced packet comprises an ATM header, MPLS label stack, control word and the AAL5 CPCS-SDU. The method 500 ceases at stop block 599.

The present method and system improves the scalability of AAL5 over MPLS connection provisioning, by sending multiple ATM connections over a single VC label. This also reduces the number of VC label negotiation sessions required.

A system and method for AAL5 enhanced encapsulation has been disclosed. Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method, comprising:
   receiving an Asynchronous Transfer Mode (ATM) Adaptation Layer 5 (AAL5) Common Part Convergence Sublayer-Service Data Unit (CPCS-SDU) at a router;
   encapsulating the AAL5 CPCS-SDU into an AAL5 enhanced packet at the router;
   generating an Multi-protocol Label Switching (MPLS) packet from the AAL5 enhanced packet, wherein the AAL5 enhanced packet comprised an ATM header and a control word, the control word comprising a transport type bit to properly identify whether the MPLS packet contains an ATM cell or an AAL5 CPCS-SDU; and
   routing the MPLS packet over an MPLS network.

2. The method of claim 1, wherein the AAL5 enhanced packet further comprises:
   an MPLS label stack; and
   wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

3. The method of claim 2, wherein the router is a label switch router.

4. The method of claim 2, wherein the router is a label edge router.

5. The method of claim 2, further comprising:
   receiving secondary SDUs of layer 2 protocols at the router, wherein the layer 2 protocols comprise Frame Relay, ATM Cell, Ethernet, and SONET.

6. A method comprising:
   receiving an MPLS packet at a router;
   decapsulating the MPLS packet when the MPLS packet is an AAL5 enhanced packet;
   producing an AAL5 CPCS-SDU from the AAL5 enhanced packet, wherein the AAL5 enhanced packet comprises an ATM header and a control word, the control word comprising a transport type bit to properly identify whether the MPLS packet contains an ATM cell or an AAL5 CPCS-SDU.

7. The method of claim 6, wherein the AAL5 enhanced packet further comprises:
   an MPLS label stack; and
   wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

8. The method of claim 7, wherein the router is a label switch router.

9. The method of claim 7, wherein the router is a label edge router.

10. The method of claim 7, further comprising:
generating secondary SDUs of layer 2 protocols from the MPLS packet at the router, wherein the layer 2 protocols comprise Frame Relay, ATM Cell, Ethernet, and SONET.

11. A computer readable medium having stored thereon a plurality of instructions, said plurality of instruction when executed by a computer, cause the computer to perform:
receiving an AAL5 CPCS-SDU at a router;
encapsulating the AAL5 CPCS-SDU into an AAL5 enhanced packet at the router;
generating an MPLS packet from the AAL5 enhanced packet, wherein the AAL5 enhanced packet comprises an ATM header and a control word, the control word comprising a transport type bit to properly identify whether the MPLS packet contains an ATM cell or an AAL5 CPCS-SDU; and
routing the MPLS packet over an MPLS network.

12. The computer-readable medium of claim 11, wherein the AAL5 enhanced packet further comprises:
an MPLS label stack; and
wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

13. The computer-readable medium of claim 12, wherein the router is a label switch router.

14. The computer-readable medium of claim 12, wherein the router is a label edge router.

15. The computer-readable medium of claim 12 having stored thereon additional instructions, said additional instructions when executed by a computer, cause said computer to further perform:
receiving secondary SDUs of layer 2 protocols at the router, wherein the layer 2 protocols comprise Frame Relay, ATM Cell, Ethernet, and SONET.

16. A computer readable medium having stored thereon a plurality of instructions said plurality of instructions when executed by a computer, cause said computer to perform:
receiving an MPLS packet at a router;
decapsulating the MPLS packet when the MPLS packet is an AAL5 enhanced packet;
producing an AAL5 CPCS-SDU from the AAL5 enhanced packet, wherein the AAL5 enhanced packet comprises an ATM header and a control word, the control word comprising a transport type bit to properly identify whether the MPLS packet contains an ATM cell or an AAL5 CPCS-SDU.

17. The computer-readable medium of claim 16, wherein the AAL5 enhanced packet further comprises:
an MPLS label stack; and
wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

18. The computer-readable medium of claim 17, wherein the router is a label switch router.

19. The computer-readable medium of claim 17, wherein the router is a label edge router.

20. The computer-readable medium of claim 12 having stored thereon additional instructions, said additional instructions when executed by a computer, cause said computer to further perform:
generating secondary SDUs of layer 2 protocols from the MPLS packet at the router, wherein the layer 2 protocols comprise Frame Relay, ATM Cell, Ethernet, and SONET.

21. A system, comprising:
means for receiving an AAL5 CPCS-SDU at a router;
means for encapsulating the AAL5 CPCS-SDU into an AAL5 enhanced packet at the router;
means for generating an MPLS packet from the AAL5 enhanced packet, wherein the AAL5 enhanced packet comprises an ATM header and a control word, the control word comprising a transport type bit to indicate that the MPLS packet comprises an AAL5 CPCS-SDU; and
means for routing the MPLS packet over an MPLS network.

22. The system of claim 21, wherein the AAL5 enhanced packet further comprises:
an MPLS label stack; and
wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

23. The system of claim 22, wherein the router is a label switch router.

24. The system of claim 22, wherein the router is a label edge router.

25. The system of claim 22, further comprising:
means for receiving secondary SDUs of layer 2 protocols at the router, wherein the layer 2 protocols comprise Frame Relay, ATM Cell, Ethernet, and SONET.

26. A system comprising:
means for receiving an MPLS packet at a router;
means for decapsulating the MPLS packet when the MPLS packet is an AAL5 enhanced packet;
means for producing an AAL5 CPCS-SDU from the AAL5 enhanced packet, wherein the AAL5 enhanced packet comprises an ATM header and a control word, the control word comprising a transport type bit to indicate that the MPLS packet comprises an AAL5 CPCS-SDU.

27. The system of claim 26, wherein the AAL5 enhanced packet further comprises:
an MPLS label stack; and
wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

28. The system of claim 27, wherein the router is a label switch router.

29. The system of claim 27, wherein the router is a label edge router.

30. The system of claim 27, further comprising:
means for generating secondary SDUs of layer 2 protocols from the MPLS packet at the router, wherein the layer 2 protocols comprise Frame Relay, ATM Cell, Ethernet, and SONET.

31. A router, comprising:
a processor; and
memory connected to the processor storing instructions for AAL5 enhanced encapsulation executed by the processor;
wherein the processor performs the enhanced AAL5 encapsulation, by
receiving an AAL5 CPCS-SDU;
encapsulating the AAL5 CPCS-SDU into an AAL5 enhanced packet;
generating an MPLS packet from the AAL5 enhanced packet, wherein the AAL5 enhanced packet comprises an ATM header and a control word, the control word comprising a transport type bit to indicate that the MPLS packet comprises an AAL5 CPCS-SDU; and
routing the MPLS packet over an MPLS network.

32. The router of claim 31, wherein the AAL5 enhanced packet further comprises:
an MPLS label stack; and
wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

33. The router of claim 32, wherein the router is a label switch router.

34. The router of claim 32, wherein the router is a label edge router.

35. The router of claim 32, wherein the processor further performs:
receiving secondary SDUs of layer 2 protocols, wherein the layer 2 protocols comprise Frame Relay, ATM Cell, Ethernet, and SONET.

36. A router comprising:
a processor; and
memory connected to the processor storing instructions for AAL5 enhanced decapsulation executed by the processor;
wherein the processor performs the AAL5 enhanced decapsulation, by receiving an MPLS packet;
decapsulating the MPLS packet when the MPLS packet is an AAL5 enhanced packet;
producing an AAL5 CPCS-SDU from the AAL5 enhanced packet, wherein the AAL5 enhanced packet comprises an ATM header and a control word, the control word comprising a transport type bit to indicate that the MPLS packet comprises an AAL5 CPCS-SDU.

37. The router of claim 36, wherein the AAL5 enhanced packet further comprises:
an MPLS label stack; and
wherein the control word comprises a first bit that is set to a frame relay command/response bit of the AAL5 CPCS-SDU in the MPLS packet, a transport type bit to indicate that the MPLS packet comprises an AAL5 CPCS-SDU, and a length field to indicate a length of the MPLS packet.

38. The router of claim 37, wherein the router is a label switch router.

39. The router of claim 37, wherein the router is a label edge router.

40. The router of claim 37, wherein the processor further performs:
generating secondary SDUs of layer 2 protocols from the MPLS packet, wherein the layer 2 protocols comprise Frame Relay, ATM Cell, Ethernet, and SONET.

* * * * *